J. P. FISHER.
DEAD WEIGHT GAGE TESTER.
APPLICATION FILED AUG. 12, 1916.
1,217,735.
Patented Feb. 27, 1917.
2 SHEETS—SHEET 1.
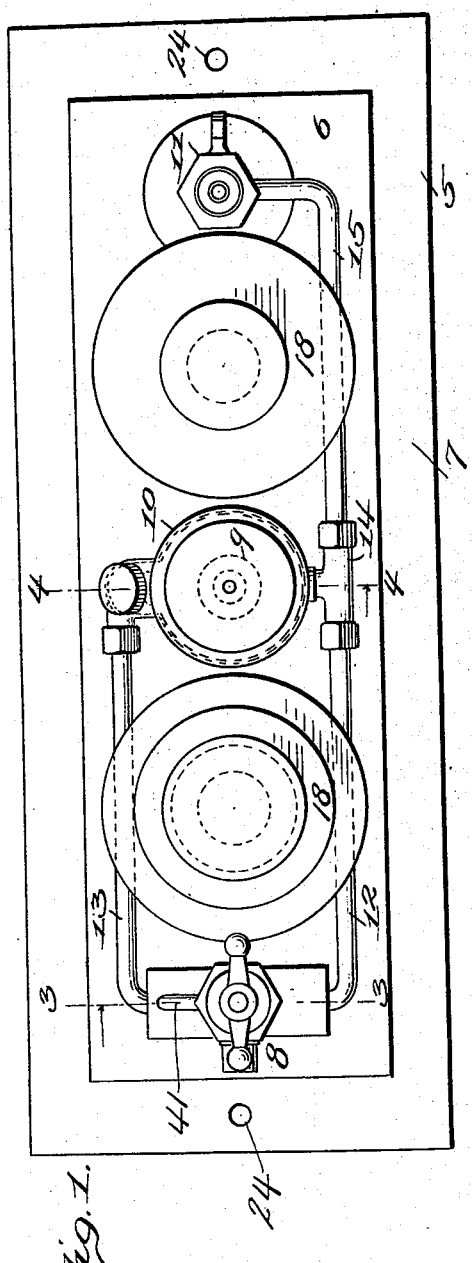
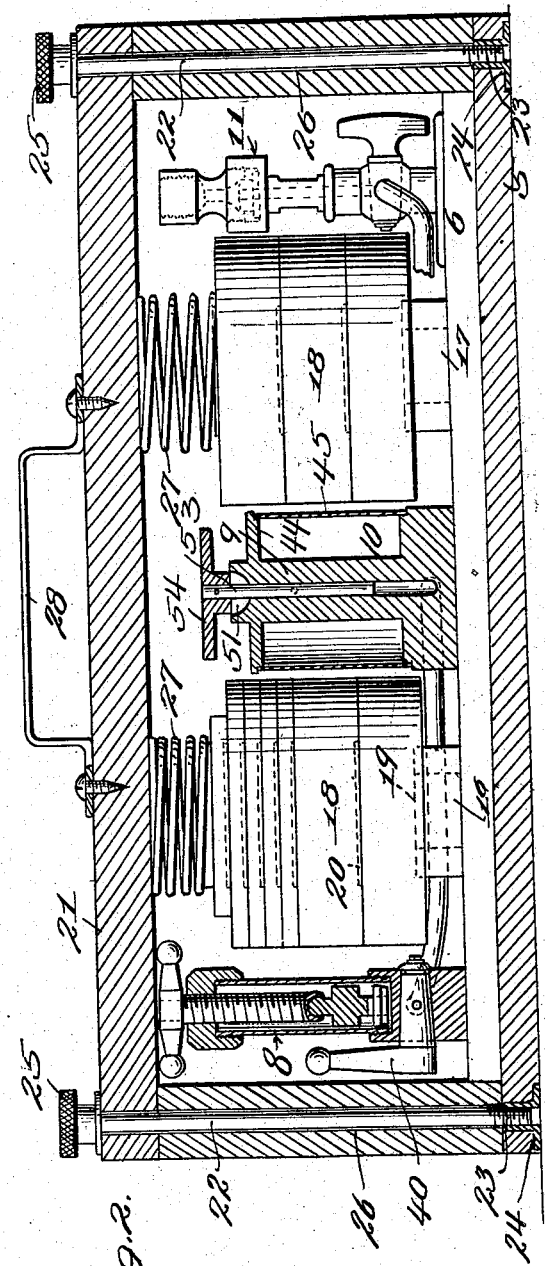
Witnesses:
Chas. S. Hoyer
Inventor
James P. Fisher
by
Attorney

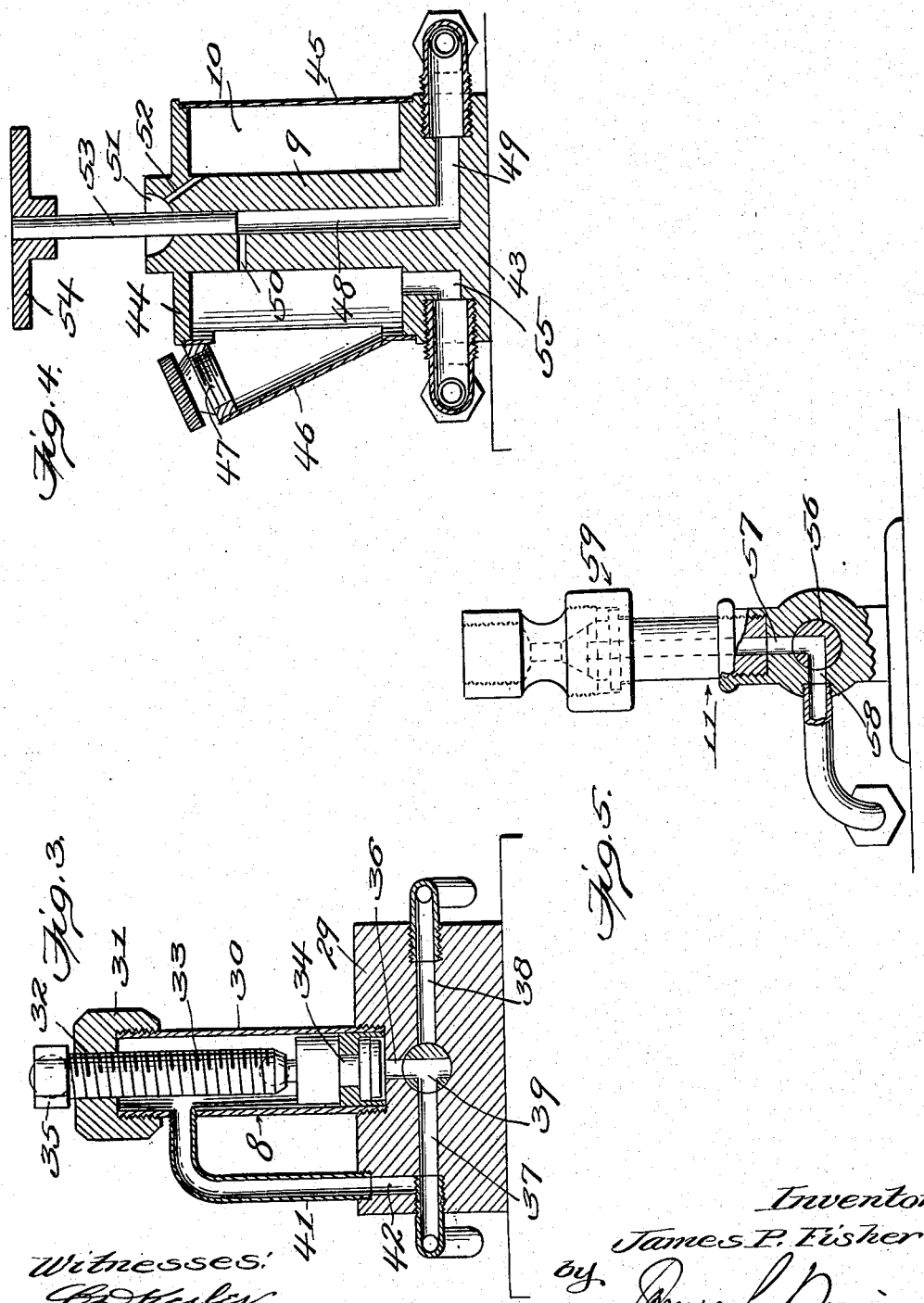

UNITED STATES PATENT OFFICE.

JAMES P. FISHER, OF BARTLESVILLE, OKLAHOMA.

DEAD-WEIGHT GAGE-TESTER.

1,217,735.  Specification of Letters Patent.  Patented Feb. 27, 1917.

Application filed August 12, 1916.  Serial No. 114,616.

*To all whom it may concern:*

Be it known that I, JAMES P. FISHER, a citizen of the United States, residing at Bartlesville, in the county of Washington and State of Oklahoma, have invented new and useful Improvements in Dead-Weight Gage-Testers, of which the following is a specification.

This invention relates to a gage tester, and one object thereof is to provide a dead weight gage tester of a portable character comprising in its equipment a plurality of calibrated weights that may be readily transported with the testing mechanism and an inclosure easily separable from said mechanism and including means for preventing accidental displacement of the weights from a predetermined stored position. A further object of the invention is to reduce the proportions and minimize the parts of a gage tester of the type specified to such an extent as to render the same comparatively light and conveniently transportable without detracting from the necessary pressure generation thereof and requisite reliability in the performance of its test functions. A further object of the invention is to produce a tester in which pressures may be developed through the direct action of weights to any degree desired and to generally improve the construction and organization of the parts of the gage tester and condense the several coöperating elements and principally to arrange the reservoir for the pressure medium around the working barrel of the mechanism and to provide said barrel with openings in different parts thereof to permit the pressure medium to unretardedly drain back from the barrel into the reservoir when the piston has reached a certain elevation and also to recover any leakage around the piston.

With these and other objects and advantages in view the invention consists in the preferred construction and arrangement of the several parts which will be more fully hereinafter described and claimed.

In the drawings:

Figure 1 is a top plan view of the dead weight gage tester embodying the features of the invention and shown mounted upon a base support forming part of an inclosure therefor.

Fig. 2 is a central longitudinal vertical section of the tester showing the same fully inclosed and ready for transportation.

Fig. 3 is a transverse vertical section taken in the plane of the line 3—3, Fig. 1.

Fig. 4 is a transverse vertical section taken in the plane of the line 4—4, Fig. 1.

Fig. 5 is a sectional end elevation of the gage connection with a portion of the pressure medium conveying pipe connected thereto, parts of this gage connection being shown in dotted lines.

The numeral 5 designates a base with a rectangular support 6 disposed thereon and of less dimensions than the base to form a clearance 7 around the support with relation to which the latter provides a shouldered wall for a purpose which will be presently explained. The operating mechanism of the tester is mounted on the support 6 and essentially comprises a pressure pump 8, a pressure barrel or cylinder 9 with a surrounding reservoir 10, and a gage testing connection 11, the said parts being in longitudinal alinement on the support 6 and the pressure barrel or cylinder 9 and reservoir 10 being at an intermediate point between the pressure pump 8 and the gage testing connection 11. The pressure pump 8 is connected by pipes 12 and 13 with the pressure barrel or cylinder 9, the pipe 12 running to a T-coupling 14 from which a pipe 15 continues to the gage testing connection 11. Between the pressure pump 8 and the barrel or cylinder 9 and reservoir 10, and between the latter and the gage testing connection 11 are bosses 16 and 17 on which calibrated weights 18 are mounted and are closely fitted as shown, there being alternate depressions and sockets 19 and top projections 20 formed as parts of the respective weights to provide for a snug stack association thereof relatively to the bosses 16 and 17 to prevent the said weights from slipping laterally out of place. Over the testing mechanism and weights a cover or closure 21 is adapted to be removably applied, and at the ends thereof are screw rods 22 having lower screw-threaded ends 23 to removably engage screw sockets 24 in the centers of the opposite ends of the base 5, the screw rods being provided with milled heads 25 and loosely extending through openings 26 in the opposite end of the closure and by means of which the said closure is firmly and reliably secured in a removable manner to the base 5. The walls of the closure are preferably of such thickness as to take up the clearance 7 around the support 6 and have the outer side and end surfaces of the closure coinciding with the side and end edges of the base 5. The closure at proper points is provided with depending pressure springs 27 which are secured to the top thereof and are arranged to engage the uppermost weights of the two stacks of weights to maintain the latter in associated relation or against accidental displacement. The top of the closure at the center is provided with a grip or handle 28, and after the screw rods 22 have been applied as shown by Fig. 2 the closure 21 is firmly secured to the base 5 and fully houses the testing mechanism, and the latter through the medium of the connected closure and base may be readily transported from one place to another and when it is desired to use the testing mechanism the closure 21 may be readily removed by detaching the screw bolts 22. It will thus be seen that the entire mechanism is portable and the several devices constituting the testing organization are of compact form and simple arrangement so that the inclosure and transportation thereof may be readily effected.

The pressure pump 8 as shown is what is known as a plunger pump and comprises a base 29 in which the lower end of an upright barrel 30 is secured, said barrel having a cap 31 with a screw-threaded vertical bore 32 in which a screw plunger 33 is mounted and carries a piston 34 on its lower end working in the barrel. On the upper end of the screw plunger 33 is a hand bar or turn wheel 35 for operating the said plunger and piston. The lower end of the barrel 30 communicates with a vertical passage 36 in the base 29, said passage intersecting oppositely extending passages 37 and 38, a three-way valve 39 being mounted at the point of intersection of the passages 36, 37 and 38, this valve having an exteriorly located operating handle 40, as shown by Fig. 2. The barrel 30 is also provided with a relief connection 41 extending down to the base 29 and communicating with a relief port 42 opening into the passage 37. The pipes 12 and 13 are respectively connected to the outer terminals of the passages 38 and 37 and run to the pressure barrel or cylinder 9 as hereinbefore explained.

The pressure barrel or cylinder 9, as clearly shown by Fig. 4, is provided with a base 43 and with a disk head 44, and between the said head and base a reservoir inclosure 45 is mounted, being secured at its ends respectively to the base and head in concentric relation to the barrel or cylinder 9. Communicating with the reservoir wall or inclosure 45 is a filling tube 46 which is disposed at an angle and is provided with a closing plug 47. Through the medium of this tube the reservoir 10 may be supplied with the pressure medium. The barrel or cylinder 9 has a central bore 48 extending down into the base 43 and intersecting a passage 49 with which the T-coupling or union 14 connects, and at a predetermined elevation a horizontal drain port 50 is formed in the barrel or cylinder 9 and opens into the reservoir 10. The upper end of the barrel or cylinder 9 projects above the head 44 and is formed with a basin or cup 51, and therefrom a drain port 52 extends downwardly at an angle toward and communicates with the upper portion of the reservoir 10. Within the bore 48 a plunger or piston 53 is mounted and has a disk or support 54 on its upper end which is designed for receiving various weights 18. The base 43 also has an angular passage 55 communicating with the bottom of the reservoir and opening out through one end of the base, the pipe 13 from the pressure pump 8 being connected to this passage and by means of which the pressure medium is taken from the reservoir to the said pump and the latter gives the said medium the requisite pressure and forces the same into the pipe 12 and T-coupling 14 into the passage 49 and thence into the bore 48 under the plunger or piston 53. The pressure medium used is preferably oil, and the pressure imparted thereto by the pump 8 will be attained by first raising the screw plunger 33 and piston 34 of this pump and then causing the plunger and piston to descend against the oil which has been drawn into the barrel 30 by way of the pipe 13, the valve 39 being first turned to set up communication of the passage 37 with the passage 36 and the pump barrel 30 and shut off communication between the passage 36 and the passage 38. After the barrel 30 has been charged with oil from the reservoir 10 the valve 39 is then turned to set up communication between the passage 36 and the passage 38, and by operating the screw plunger 33 and the piston 34 in a downward direction against the oil in the barrel 30 cumulative pressure is exerted on the oil and transmitted through the passage 49 and bore 48 to the plunger 53 and also by way of the pipe 15 to the gage testing connection 11. This gage testing connection 11 is provided with a lower plug valve 56 at the intersection of the vertical bore 57 and the lateral passage 58 of said connection, this connection being provided with a head 59 into which the bore 57 opens and suitable means whereby the gage to be tested may be attached or secured in a reliable manner.

These gage attaching connections are well known in the art and may be varied in form as may be found desirable.

The weights are disposed or placed on the disk or support 54 at the upper end of the plunger 53, the said weights being so proportioned relatively to the area of the plunger 53 as to give definite pressures to the oil below the plunger when they are placed according to the markings thereon, and the main pressure on the oil is set up within the barrel 9 by the resistance of the weight carrying plunger 53, together with the pressure pump 8 and the pressure developed by the downward movement of the plunger 33 and piston 34 of the pressure pump will be applied to the bottom of the plunger 53 in the barrel 9, and as a consequence the pressure on the oil system will be whatever is necessary to raise the said plunger 53 carrying weights on the disk or support 54. The weight of the plunger 53 has such a ratio to its size that with no weights added five pounds pressure will raise the plunger and cause it to float on the oil. In case the pump 8 is operated too long and causes the plunger 53 to rise above the port or vent 50, the oil will be bypassed through this port back into the reservoir 10, thereby preventing the plunger being raised too high and thrown out of the barrel or cylinder 9. Any oil leaking past the plunger 53 will be deposited in the cup or basin 51 and drain back through the port 52 into the upper portion of the reservoir 10.

From the foregoing it will be seen that the plunger 53 carrying the weights and having the pressure applied to the bottom thereof will be direct-acting and positive in its operation relatively to the gage to be tested and attached to the connection 11, the number of weights added regulating the pressure necessary to sustain the plunger, thereby giving a positive pressure to the gage being tested.

By arranging the reservoir 10 around the working barrel 9 and providing the drain port or vent 50 in the position shown and hereinbefore described, a very advantageous construction results in that the parts are materially condensed in the space occupied thereby and are quickly responsive in serving their several functions. A further material advantage in the present arrangement of gage testing apparatus is that all the parts may be covered and protected and transported and held in position and form a self contained unit. While the pump 8 has been particularly described as a screw plunger operated pump to illustrate one practical form of the testing apparatus complete, it will be understood that other pumps may be used that may be adapted for the purpose.

What is claimed is:

1. In a gage tester of the class specified, the combination of a base, a pressure pump located adjacent to one extremity of the base, a connection for the gage to be tested adjacent to the opposite extremity of the base, an intermediately situated plunger cylinder having a plunger with weight carrying means and a reservoir surrounding the cylinder for the pressure medium, tubular connections between the pressure pump and the said cylinder and reservoir and the connection for the gage, and a plurality of weights removably disposable on the weight carrying means of the plunger.

2. In a gage tester of the class specified, the combination of a pressure cylinder having a plunger therein provided with means for carrying weights at its upper extremity, the pressure cylinder having also a pressure medium reservoir surrounding the same and drain ports between different parts thereof and the said reservoir, a pressure pump connected to the pressure cylinder and reservoir, and a connection for the gage to be tested having pipe communication with the pump and cylinder.

3. In a gage tester of the class specified, a pressure cylinder having a vertical bore and a concentric reservoir for the pressure medium, a plunger mounted in the said bore and having a weight carrying means at the upper end thereof, the cylinder having a port communicating with the bore therein and the reservoir, and pressure generating means and a connection for the gage to be tested having pipe attaching means with relation to the pressure cylinder and reservoir.

4. In a gage tester of the class specified, a pressure cylinder having a vertical bore and surrounded by a reservoir, the cylinder having a basin at its upper extremity for leakage, a plunger vertically movable in the bore and through the basin and having weight carrying means at its upper extremity, the cylinder having a port communicating with the bore thereof and the reservoir and another port communicating with the basin and the reservoir, and pressure generating and applying means connected to the cylinder and reservoir.

5. In a gage tester of the class specified, a pressure cylinder provided with a weight carrying plunger and having a pressure medium reservoir surrounding the same, pressure generating and applying means connected to the cylinder and reservoir, and means for attaching the gage to be tested.

6. In a gage tester of the class specified, the combination of a base having pressure generating means adjacent to one end, pressure applying means for connection thereto of gages to be tested adjacent to the opposite end of the base, an intermediate pressure cylinder with a plunger and a surrounding reservoir connected to the pressure generating and applying means, and a plurality of weights removably held between the pressure generating means and the cylinder and reservoir and also between the latter and the pressure applying means.

7. In a gage tester of the class specified, the combination of a base having pressure generating means adjacent to one end, pressure applying means for connection thereto of gages to be tested adjacent to the opposite end of the base, an intermediate pressure cylinder with a plunger and a surrounding reservoir connected to the pressure generating and applying means, a plurality of weights removably held between the pressure generating means and the cylinder and reservoir and also between the latter and the pressure applying means, and a closure removably secured to the base and completely housing the parts of the tester and provided with depending springs to engage the weights.

8. In a gage tester of the class specified, a base, a pressure cylinder provided with a weight carrying plunger and surrounded by a pressure medium reservoir, pressure generating and applying means connected to the cylinder and reservoir, weights held between the pressure medium reservoir and cylinder and the pressure generating and applying means, the weights being removable from their positions between the reservoir and cylinder and applicable to the said weight carrying plunger, and a closure removably fitted over the said parts and connected to the base for completely housing the tester mechanism and rendering the latter portable.

9. In a gage tester of the class specified, a base, a pressure cylinder provided with a weight carrying plunger and surrounded by a pressure medium reservoir, pressure generating and applying means connected to the cylinder and reservoir, weights held between the pressure medium reservoir and cylinder and the pressure generating and applying means, and a closure removably fitted over the said parts and connected to the base for completely housing the tester mechanism and rendering the latter portable, the closure having means for engaging and preventing displacement of the weights during transportation of the tester mechanism.

In testimony whereof I have hereunto set my hand in presence of two subscribing witnesses.

JAMES P. FISHER.

Witnesses:
J. R. McGowan,
H. E. Richards.

Copies of this patent may be obtained for five cents each, by addressing the "Commissioner of Patents, Washington, D. C."